United States Patent [19]
Burns et al.

[11] Patent Number: 5,644,665
[45] Date of Patent: Jul. 1, 1997

[54] MULTI-OCTAVE, HIGH DYNAMIC RANGE OPERATION OF LOW-BIASED MODULATORS BY BALANCED DETECTION

[75] Inventors: William K. Burns, Alexandria, Va.; Robert P. Moeller, Ft. Washington, Md.; Ganesh K. Gopalakrishnan, Hatbro, Pa.

[73] Assignee: The United States of America as represented by the Secretary of the Navy, Washington, D.C.

[21] Appl. No.: 508,119

[22] Filed: Jul. 27, 1995

[51] Int. Cl.⁶ .................................................. G02F 1/035
[52] U.S. Cl. .................. 385/3; 385/1; 385/2; 359/238; 359/239
[58] Field of Search ................ 385/1–3, 5, 8, 385/9, 10, 14, 122; 359/326–328, 237–239, 245, 161

[56] References Cited

U.S. PATENT DOCUMENTS

| | | | |
|---|---|---|---|
| 4,502,037 | 2/1985 | Le Parquier et al. | 385/3 X |
| 4,694,276 | 9/1987 | Rastegar | 385/3 X |
| 4,947,170 | 8/1990 | Falk | 385/122 X |
| 5,031,235 | 7/1991 | Raskin et al. | 385/15 X |
| 5,101,450 | 3/1992 | Olshansky | 385/3 |
| 5,104,223 | 4/1992 | Germillion | 356/345 |
| 5,109,441 | 4/1992 | Glaab | 385/1 |
| 5,161,206 | 11/1992 | Djupsjobacka | 385/2 |
| 5,168,534 | 12/1992 | McBrien et al. | 385/3 |
| 5,323,406 | 6/1994 | Yee et al. | 385/3 X |
| 5,373,383 | 12/1994 | LaGasse | 359/161 |
| 5,515,199 | 5/1996 | Farina | 359/326 |

OTHER PUBLICATIONS

M.L. Farwell et al, "Increased Linear dynamic range by low biasing the Mach–Zender modulator", IEEE Photonics Tech. Lett. vol. 5, 779, 1993. No months available.

E. Ackerman, et al, "Maximum dynamic range operation of a microwave external modulation fiber–optic link", IEEE Trans. MTT, vol. 41, 1299, 1993. No months available.

*Primary Examiner*—Rodney B. Bovernick
*Assistant Examiner*—Hemang Sanghavi
*Attorney, Agent, or Firm*—Thomas E. McDonnell

[57] ABSTRACT

An optical link is disclosed that is operated by a balanced detection technique so as to extend its linear dynamic range, yet substantially eliminate even-order harmonic distortion of the modulated signal. The modulator comprises two parallel arranged Mach-Zehnder interferometers that respectively have a steady state DC voltage bias applied so that the operating points of the Mach-Zehnder interferometers are selected to produce two separate modulated signals, one of which is later phase shifted by a phase shift device so as to provide an output that is combined with the other modulated signal in such a manner so as to cause a subtraction, leaving the final output signal substantially free of any unwanted even-order harmonic components in order to provide for a multi-octave response characteristic.

8 Claims, 4 Drawing Sheets

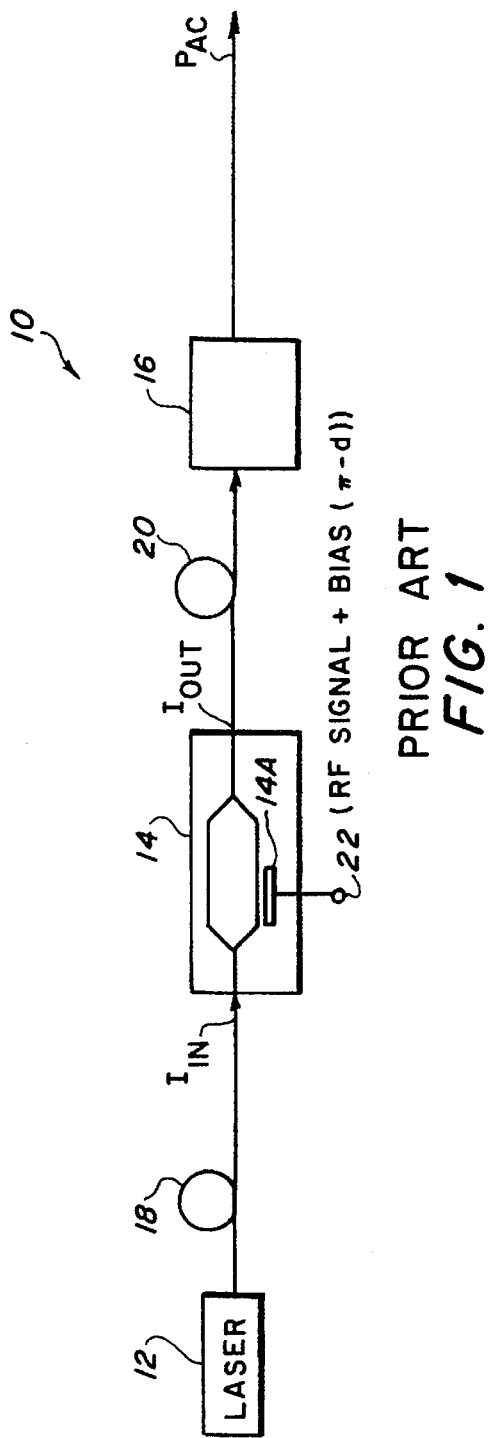
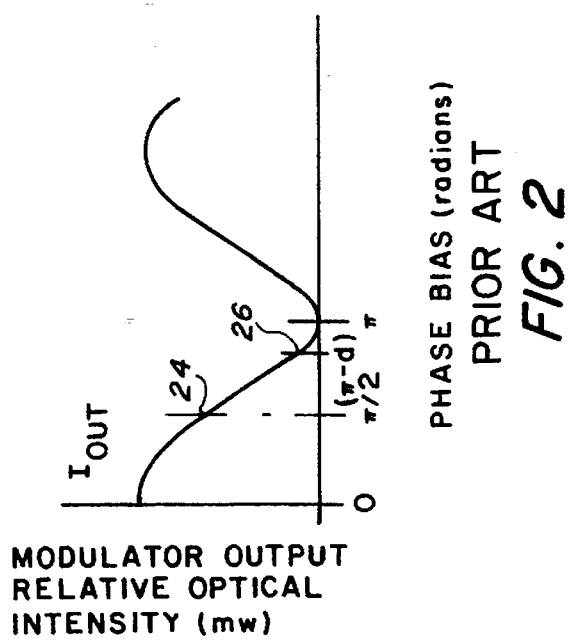

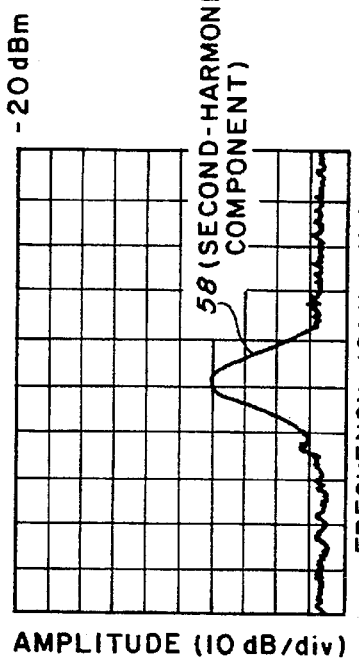
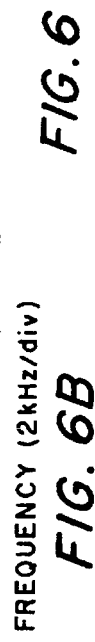
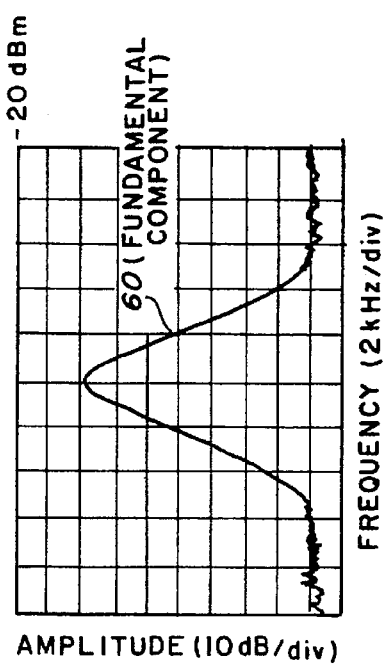
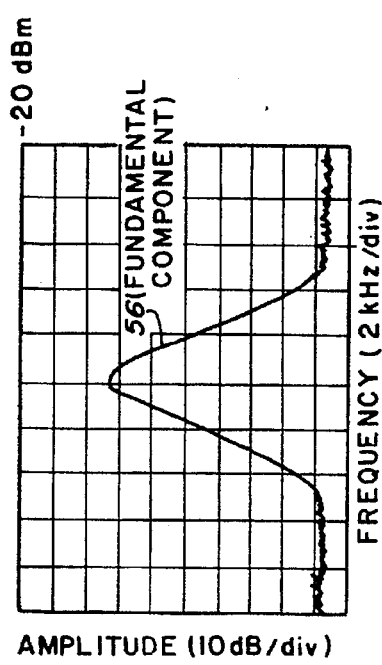

MULTI-OCTAVE, HIGH DYNAMIC RANGE OPERATION OF LOW-BIASED MODULATORS BY BALANCED DETECTION

FIELD OF THE INVENTION

The present invention relates to optical links and, more particularly, to an optical link operated by using a balanced detection technique so as to extend the bandwidth of the system, yet substantially eliminate even-order harmonic distortion of the modulated signal.

BACKGROUND OF THE INVENTION

In telecommunication systems, there are numerous applications in which it is preferred to transmit either analog or digital signals over an optical fiber instead of over an electrically conductive cable. Recently there has been a considerable development effort focused on improving the microwave performance of fiber-optic links used in telecommunication systems. A major component involved in this developmental effort is an optical modulator.

Optical modulators, sometimes referred to as electro-optic modulators, receive coherent light in the form of a laser beam commonly referred to as an optical carrier. The optical modulator modulates the optical carrier with an informational signal having a relatively high frequency in the upper megahertz range. The optical modulator is commonly provided in the form of a Mach-Zehnder interferometer, well known in the art, and described, for example, in U.S. Pat. Nos. 4,502,037; 5,109,441; 5,168,534; and 5,373,383; all herein incorporated by reference. The modulator serves as a waveguide and may be provided as an integrated optic ("IO") device fabricated from a semiconductor or insulator material in a manner more fully described in U.S. Pat. No. 5,168,534, as well as in the technical article "Linear Interferometric Waveguide Modulator for Electromagnetic-Field Detection" of C. H. Bulmer et al, published in OPTICS LETTERS, Vol. 5, No. 5, May, 1980, and are herein incorporated by reference. The modulator provides an optical output which is commonly demodulated by a photovoltaic detector. The operation of the modulator and its associated detector circuit have certain drawbacks. More particularly, the modulator generates unwanted harmonic components during its operation and the detector circuit has limitations with regard to its sensitivity.

FIRST PROBLEM

The Mach-Zehnder interferometers and the detector circuits are both desired to be operated in their linear range and which is sometimes referred to as the linear dynamic range (LDR) of a communication link which is a measurement of the limits of operation of the link itself. The linear dynamic range of the Mach-Zehnder interferometer is of particular importance when serving as an electric field sensor. Improvements to this linear dynamic range are described in two (2) technical papers, with the first entitled "Increased Linear Dynamic Range by Low-Biasing the Mach-Zehnder Modulator" of M. L. Farwell et al, and the second entitled "Maximum Dynamic Range Operation of a Microwave External Modulation Fiber-Optic Link" of E. Ackerman et al, both of which are also herein incorporated by reference.

As more fully described in the technical article of M. L. Farwell et al, Mach-Zehnder interferometers have a sinusoidal response and are typically operated with a 50% optical bias, that is, the operating point is selected to correspond to the 90 degree ($\pi/2$) position on the response curve of the Mach-Zehnder interferometer, referred to as the quadrature point and which is also described in U.S. Pat. No. 5,168,534 with reference to the response curve or transfer function illustrated in FIG. 2 therein. The selection of the 50% optical bias, also commonly referred to as "Operating at Quadrature," is advantageous since it improves the linear dynamic range. Both of these technical articles describe further improvements to the linear dynamic range by lowering the bias point to reduce the average DC level on the detector. Both of these low bias approaches allow for the use of laser sources having relatively high power available, while avoiding detector saturation. However, the operation of the modulator with decreased bias disadvantageously increases the unwanted second, and more generally even-order harmonic distortion of the modulator signal which limits the operation of the modulator to a narrow bandwidth. It is desired that the linear dynamic range of an optical link be increased, but without encountering increased unwanted even-order harmonic components so that the optical link may have a multi-octave response characteristic.

SECOND PROBLEM

Both the technical articles of M. L. Farwell et al and E. Ackerman et al describe that lowering of the bias point is accomplished without driving the detector circuit into saturation so that linear operation of the detector circuit is advantageously preserved. However, preserving the linear operation of the detector circuit while still allowing for the optical link to generate unwanted even-order harmonic components during its modulation operation is not a satisfactory solution. It is desired that the linearity of the detector circuit operation be preserved while at the same time eliminating the optical link's unwanted generation of the even-order harmonic components.

SUMMARY OF THE INVENTION

Accordingly, an object of the present invention is to provide an optical link particularly suited for a telecommunication network that does not suffer from the prior art techniques of generating unwanted even-order harmonic components during its modulation operation.

Another object of the present invention is to provide for an optical link that cooperates with a linearly operated photovoltaic detector so as to improve the sensitivity therebetween and to more readily serve as an electric field sensor.

A still further object of the present invention is to provide an optical link having a predetermined bias so as to provide for a predetermined operating point that substantially eliminates the generation of unwanted even-order harmonic components, as well as provides for being able to respond to a relatively low-level applied stimulus so as to manifest a relatively high sensitivity particularly suited for electric field sensor applications.

Further still, it is an object of the present invention to provide an optical link that increases the linear dynamic range of a fiber optic telecommunication network.

The present invention is directed to an optical link that is operated using a balanced detection technique so as to extend the linear dynamic range of a telecommunication system, yet substantially eliminate even-order harmonic distortion of the modulated signal.

The optical link modulates an optical carrier with an information signal and comprises an optical power splitter, first and second modulators, first and second detectors and a 180° phase shift device. The optical power splitter receives the optical carrier and provides about one-half of the power of the optical carrier to a first path and the remaining power of the optical carrier to a second path. The first modulator receives the optical carrier having about one-half of the original power at the first path and has means for receiving both the information signal and a steady-state bias signal with a positive offset quantity to preset the operating point of the first modulator. The first modulator provides a first optical output signal modulated by the information signal and representative of the optical carrier present at the first path. The second modulator receives the optical carrier having about one-half of the original power at the second path and has means for receiving both the information signal and a steady-state bias signal with a negative offset quantity to preset the operating point of the second modulator. The second modulator provides a second optical output signal modulated by the information signal and representative of the optical carrier present at the second path. The first detector receives the first optical output signal and develops a representative first rf output signal therefrom. The second detector receives the second optical output signal and develops a representative second rf output signal therefrom. The 180° phase shift device is connected to receive one of the first and second rf output signals and has means for connecting its output to the other of the first and second rf output signals so as to provide for a combined output comprising the first and second output signals. The combined output serves as the output signal of the optical link.

BRIEF DESCRIPTION OF THE DRAWINGS

These and other objects, features and advantages of the present invention, as well as the invention itself, will become better understood by reference to the following detailed description when considered in conjunction with the accompanying drawings, wherein like reference numbers designate identical or corresponding parts throughout the several views, and wherein:

FIG. 1 is a block diagram of a prior art low-biased optical link.

FIG. 2 is a graph illustrating the operating point of the optical link of FIG. 1.

FIG. 5 is composed of FIGS. 5(a) and 5(b) that respectively illustrate the prior art waveforms of the fundamental component and the unwanted second-order harmonic component of an information signal used in modulating an optical carrier.

FIG. 6 is composed of FIGS. 6(a) and 6(b) that respectively illustrates the waveforms of the present invention of the fundamental component and the reduced unwanted second-harmonic component of an information signal used in modulating an optical carrier.

DETAILED DESCRIPTION OF THE PREFERRED EMBODIMENTS

Figure 3:
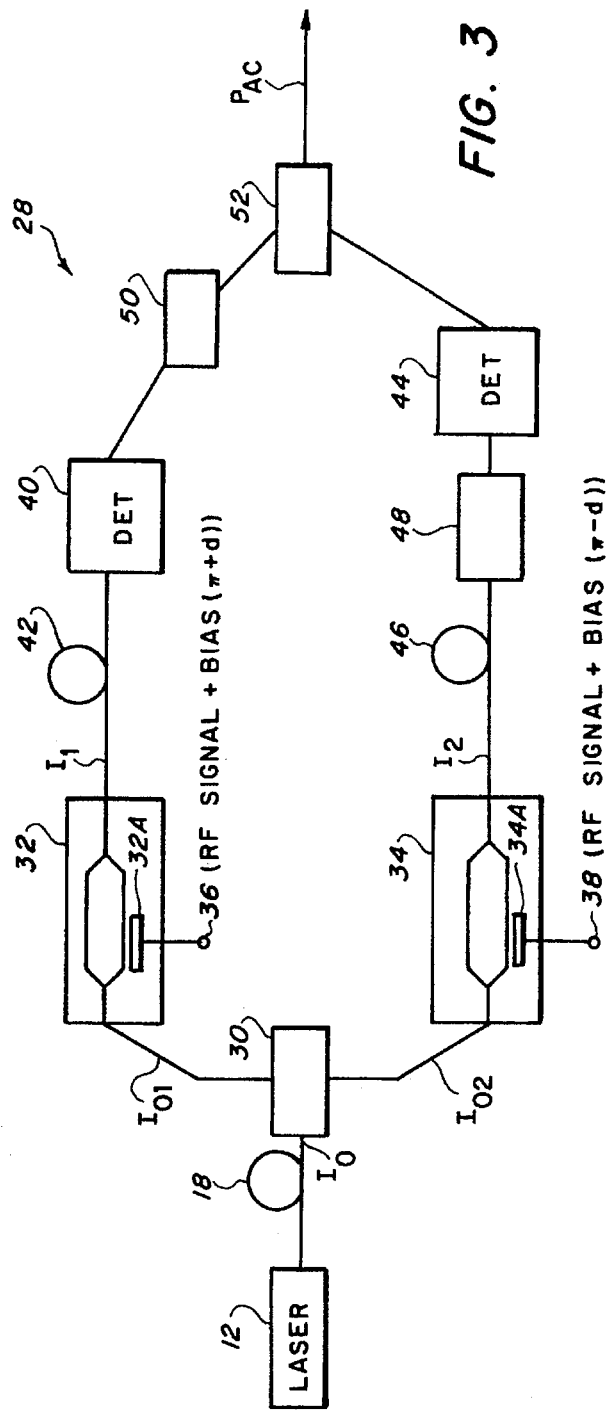
FIG. 3 is a block diagram of the optical link of the present invention having two parallel arranged Mach-Zehnder interferometric modulators.

With reference to the drawing, FIG. 1 illustrates a prior art optical link 10 which may be first described in order to more fully appreciate the principles of the present invention. The optical link 10 embodies the operational parameters described in both the technical articles of E. Ackerman et al and M. L. Farwell et al.

The optical link 10 receives coherent light $I_{IN}$ from a laser 12, and comprises an amplitude modulator 14, such as a Mach-Zehnder interferometer, and a detector 16. The laser 12 is preferably connected to the modulator 14 by an optical fiber 18, well known in the art, which carries the optical power signal $I_{IN}$ generated by the laser 12. The output $I_{OUT}$ of the Mach-Zehnder interferometer 14 is coupled to the detector 12 by an optical fiber 20.

The laser 12 may be an Nd-YAG laser having an operating wavelength of 1.3 micrometers and having a power output of about 300 milliWatts (mW). The present invention, as to be described, makes use of this relatively high available power of the laser 12 for driving the light sensing circuit of the optical link of the present invention.

The Mach-Zehnder interferometer 14, generally referred to as an amplitude modulator, is well known and may be of the type disclosed in the previously incorporated by reference U.S. Pat. Nos. 4,502,037; 5,109,441; 5,168,534; and 5,373,383 and technical article of C. H. Bulmer et al. The operating principles of the Mach-Zehnder interferometer are well known and need not be further described herein but, if desired, reference may be made to these incorporated by reference U.S. Patents and the technical article of C. H. Bulmer et al for further description thereof.

The detector 16 may be an InGaAs p-i-n photodiode operated in its linear region and more particularly, operated to avoid its saturation or non-linear operational condition, as more fully described in the technical article of E. Ackerman et al. The detector 16 provides an electrical output signal $P_{AC}$ which is the output of the optical link 10 of FIG. 1.

The operation of the modulator 14 is primarily controlled by a signal 22 applied to an electrode 14A of the modulator 14. The signal 22 comprises an rf signal, serving as the information signal, and a phase bias signal ($\pi-\alpha$) which is given in radians and is obtained by applying an appropriate DC voltage. The information signal may have a typical fundamental frequency of 110 MegaHertz (Mhz). The phase bias signal ($\pi-\alpha$) determines the operating point of the modulator 14 and may be described with reference to FIG. 2.

FIG. 2 has an X axis indicating the bias signal, given in radians achieved by applying a DC voltage to electrode 14A, and a Y axis indicating the amplitude of the modulator optical output signal $I_{OUT}$ given in milliwatts. The X axis is further indicated to show the phase relationship of the signal $I_{OUT}$, wherein the 180° phase position is indicated as $\pi$. FIG. 2 further illustrates that a steady-state DC bias voltage corresponding to a phase bias of $\pi/2$ establishes an operating point 24, and a steady-state DC bias voltage corresponding to phase bias of $\pi-\alpha$, where $\alpha<\pi/2$ establishes an operating point 26. The operating point 24 represents the 50% optical bias for the modulator 14 and establishes the "Operating at Quadrature" previously discussed in the "Background" section. The operating point 26 determines the operational response of the Mach-Zehnder interferometer 14 of FIG. 1. Furthermore, the operating point 26 corresponds to the decreased bias point also discussed in the "Background" section which, as more fully disclosed in each of the technical articles of M. L. Farwell et al and E. Ackerman et al, causes the Mach-Zehnder interferometer 14 to provide for an increased linear dynamic range (LDR) but, as also previously discussed, disadvantageously generates unwanted even-order harmonic components. The present invention not only increases the linear dynamic range (LDR) of its modulator but also eliminates the generation of unwanted even-order harmonic components, and may be further described with reference to FIG. 3.

FIG. 3 illustrates an optical link 28 of the present invention comprising an optical power splitter 30 that receives the coherent optical carrier $I_0$ from laser 12, and which provides optical output signals $I_{O1}$, and $I_{O2}$, respectively to first and second modulators 32 and 34, each of which preferably comprises a Mach-Zehnder interferometer. The first modulator 32 has an electrode 32A which receives a signal 36 similar to the signal 22 described with reference to FIG. 1, with the exception that the steady-state DC bias voltage therein establishes operating point of the first modulator 32 at phase bias of $(\pi+\alpha)$, to be further described herein. Similarly, the second modulator 34 has an electrode 34A which receives a signal 38 which is the same as the signal 22 already described with reference to FIGS. 1 and 2 and establishes the operating point of the second modulator 34 at phase bias of $(\pi-\alpha)$.

The first modulator 32 provides an output optical signal $I_1$ which is routed to a detector 40 by means of an optical fiber 42. Similarly, the second modulator 34 provides a second optical output signal $I_2$ that is routed to detector 44 by an optical fiber 46 and, preferably, by a piezoelectric fiber stretcher 48 to be further described. Both detectors 40 and 44 may be similar to the detector 16 of FIG. 1, whereas the optical fibers 42 and 46 may be similar to the optical fiber 20 of FIG. 1.

The output of detector 40, an electrical output signal, is applied to a 180° phase shifter 50 which, in turn, has its output applied to a signal combiner 52, and the output of detector 44, also an electrical output signal, is applied directly to the signal combiner 52. Alternatively, the 180° phase shifter 50 may be swapped and placed in the output path of detector 44, or phase shifters (not shown) may be placed in the output paths of both detectors 40 and 44 so long as the signals provided to combiner 52 are 180° out of phase. The piezoelectric fiber stretcher 48 may similarly be swapped and placed in the input path of detector 40 or fiber stretcher may be placed in the input paths of both detectors 40 and 44. Alternatively, the phase shifter 50 and combiner 52 may be combined into a single device (not shown) form the signal $P_{AC}$ located at the output stage of the optical link 28.

The optical power splitter 30, located at the input stage of the optical link 28, is known in the art and receives, via the optical fiber 18, the optical carrier $I_0$ and provides about one-half of the power of the optical carrier $I_0$ to a first path having a predetermined path and the remaining power of the optical carrier $I_0$ is directed to a second path, also having a predetermined path. The optical signal delivered to the first path is $I_{O1}$ and the optical signal delivered to the second path is $I_{O2}$.

The first modulator 32 receives the optical signal $I_{O1}$ and modulates it with the information signal contained in input signal 36 and delivered to electrode 32A. The modulation of the optical signal $I_{O1}$ by the information signal is in accordance with the operating point established by the steady-state phase bias of $(\pi+\alpha)$. The second modulator 34 receives the optical signal $I_{O2}$ and modulates that signal with the information signal contained in input signal 38 and delivered to electrode 34A. The modulation of the optical signal $I_{O2}$ by the information signal is in accordance with the operating point established by the steady-state phase bias of $(\pi-\alpha)$.

The first and second detectors 40 and 44 respectively receive the first optical output signal $I_1$ from the first modulator 32 and the second optical output signal $I_2$ from the second modulator 34 and provide representative electrical rf output signals therefor. The detectors 40 and 44 each preferably comprises a filtering network that reduces or even eliminates the DC signal components that may be present in optical output signals $I_1$ and $I_2$.

The 180° phase shift device 50 is connected to receive one of the first and second rf output signals from detectors 40 and 44 and cooperates with the signal combiner 52 so that the first and second output signals from detectors 40 and 44, respectively, are electrically combined to form the output signal $P_{AC}$ of the optical link 28. The operating points that control the modulation operation of the first and second modulators 32 and 34 may be further described with reference to FIG. 4.

Figure 4:
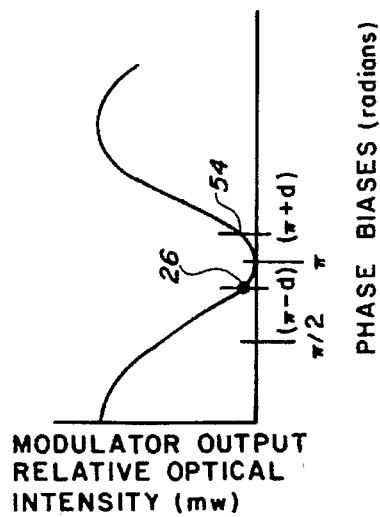
FIG. 4 illustrates the operating points for each of the Mach-Zehnder interferometers arranged in FIG. 3.

FIG. 4 is similar to FIG. 2 and illustrates the operating point 26 already described for the modulator 14 of FIG. 1 and which is also the operating point 26 of the second modulator 34. However, in addition, FIG. 4 illustrates a further operating point 54 established by the phase bias $(\pi+\alpha)$. Accordingly, the optical link 28 of FIG. 3 is provided with two operating points, the first being operating point 26 for the second modulator 34 and the second being operating point 54 for the first modulator 32.

In general, the operation of the optical link 28 uses a balanced detection technique to eliminate unwanted even-order harmonic distortion and also to provide for an improvement in its sensitivity. The term "balanced detection" technique refers to the combination of two signals so as to eliminate any unwanted components. The optical link 28 modulates the coherent carrier signal $I_0$, in particular, the signals $I_{O1}$ and $I_{O2}$ present on the first and second paths, respectively, with the information signal, shown as an rf signal, that is contained in both input signals 36 and 38 and which may be represented by the following expression:

$$\phi_m \cdot \sin(\omega t) \qquad \text{(Expression 1)}$$

The quantity $\alpha$ that is used to establish the operating points 54 and 26 for the first and second modulators 32 and 34, respectively, preferably has a value of about $\pi/4$ or less. The first and second modulators 32 and 34 respectively receive the signals $I_{O1}$ and $I_{O2}$ and correspondingly provide output signals $I_1$ and $I_2$ with optical intensity that may be respectively expressed by the below expressions:

$$I_1 = \frac{1}{2} I_{O1} \left[ 1 - \cos\alpha + \phi_m \sin\alpha \sin\omega t - \left(\frac{\phi_m}{2}\right)^2 \cos\alpha \cos 2\omega t + \ldots \right] \qquad (2)$$

$$I_2 = \frac{1}{2} I_{O2} \left[ 1 - \cos\alpha - \phi_m \sin\alpha \sin\omega t - \left(\frac{\phi_m}{2}\right)^2 \cos\alpha \cos 2\omega t + \ldots \right], \qquad (3)$$

where $I_0 = I_{O1} + I_{O2}$ is the intensity of the carrier light $I_0$.

A Bessell function expansion was used in the derivation of expressions (2) and (3). Because the quantity $\phi_m$ is typically relatively small, the higher order harmonic terms of expressions (2) and (3) are omitted. A comparison between expressions (2) and (3) reveals that the terms are similar except for the quantities $+\phi_m \sin\alpha \cdot \sin(\omega t)$ and $-\phi_m \sin\alpha \cdot \sin(\omega t)$.

The signal $I_1$ of expression (2) is routed to the detector 40, and the signal $I_2$ of expression (3) is routed to detector 44. At each of the detectors 40 and 44, the DC component of the modulator signal $I_1$ and $I_2$ is blocked and the rf output signal of detector 40 is routed to the 180° phase shift device 50 which, in turn, provides an rf output that is applied to the signal combiner 52. The signal combiner 52, in one embodiment, combines the rf output signal from the 180° phase shifter 50 with the rf output signal of the detector 44 to form signal $P_{AC}$. In another embodiment, the 180° phase shifter 50 is in the output path of detector 44 but the combined signal $P_{AC}$ remains the same. The combined electrical output signal $P_{AC}$ of the optical link 28 has intensity represented by the following expression:

$$P_{AC} = \tfrac{1}{4} R \cdot I_0 [2\phi_m \sin\alpha \sin\omega t + \text{higher order odd harmonic components}], \quad (4)$$

where R is a factor representing the responsivity of detectors 40 and 44.

A review of expression (4) reveals that output signal $P_{AC}$ is expressed in terms of $I_o$, which is accomplished by assuming $I_{o1} = I_{o2}$ each of which is equal to $I_o/2$. A further review of expression (4) reveals that it is devoid of any even-order harmonic components. It should be noted that the elimination of the second order harmonic components (sometimes described herein) also eliminates other even-order harmonic components. Accordingly, the operation of the optical link 28 modulating the optical carrier, $I_0$, with the information signal $\phi_m \sin(\omega t)$ provides for the substantial elimination of the even-order harmonic components.

In order to effectively provide for the elimination of the even-order harmonic components created by the combining of the signals $I_1$ and $I_2$ and phase shifting one of the signals $I_1$ and $I_2$ with respect to the other, the power contained in the even-order harmonics of the separate signals $I_1$ and $I_2$ output from modulators 32 and 34 should be substantially equal. One method for providing these signals $I_1$ and $I_2$ with equal power is to provide an adjustable optical power splitter 30 so as to compensate for any imbalance in modulators 32 and 34.

A further consideration for providing the elimination of the even-order harmonic components concerns relative rf phase shift. Typically, the rf signals 36 and 38 are derived from the same rf source (not shown) split by an rf splitter (not shown). In order to effectively provide for the elimination of the even-order harmonic components created by the combining of the signals $I_1$ and $I_2$ and phase shifting the signals $I_1$ and $I_2$ with respect to each other, the accumulated rf phase shift encountered by a signal traveling on a first path from the rf phase splitter to the rf combiner 52 by way of modulator 32 is preferably the same as the accumulated rf phase shift encountered by a signal traveling on a second path from the rf phase splitter to the rf combiner 52 by way of modulator 34. The first and second paths are of an of an electrical conductive medium from the rf splitter to the modulators 32 and 34, of an optical medium from the modulators 32 and 34 to the detectors 40 and 44, and of an electrical conductive medium from the detectors 40 and 44 to the combiner 52. The adaptation so that the accumulated rf phase shift is substantially the same in each of the first and second paths may be provided, in a manner known in the art, by adjusting the piezoelectric fiber stretcher 48.

It should now be appreciated that the practice of the present invention provides for an optical link that modulates an optical carrier signal with an information signal and does so without generating any unwanted even-order harmonic components so that the optical link has a multi-octave response characteristic.

In the practice of this invention, testing was performed and some of the results are illustrated in FIGS. 5 and 6. The results shown in FIG. 5 were obtained using the prior art optical link 10 of FIG. 1 for $\alpha = \pi/4$, and the results shown in FIG. 6 were obtained using the balanced detection optical link 28 of FIG. 3 of the present invention, also for $\alpha = \pi/4$. The results were obtained using an information signal having a frequency of 110 MHz.

FIG. 5 is composed of FIGS. 5A and 5B each of which have an X axis given in frequency (2 kiloHertz/division (kHz/div)), and a Y axis illustrating an amplitude given in decibels (10 dB/div). FIG. 5A illustrates a plot 56 of the amplitude of the fundamental component of the 110 MHz information signal, and FIG. 5B illustrates a plot 58 of the amplitude of the second harmonic component. A comparison between FIGS. 5A and 5B reveals that the degree of distortion related to the second harmonic component of the optical link 10 is relatively high.

FIG. 6 is composed of FIGS. 6A and 6B each having X and Y axes respectively similar to FIGS. 5A and 5B and with the same scales as FIGS. 5A and 5B. FIG. 6A illustrates a plot 60 of the amplitude of the fundamental component of the 110 MHz information signal, whereas FIG. 6B indicates the plot 62 of the amplitude of the second harmonic component. A comparison between FIGS. 6A and 6B reveals that the optical link 28 of FIG. 3 generates a low second harmonic component signal relative to the fundamental component. A further comparison between FIGS. 5B and 6B reveals that the optical link 28 reduces the unwanted second harmonic component by a factor of about 28 dB, representing a substantial improvement for the optical link 28 relative to the prior art optical link 10.

Figure 7:
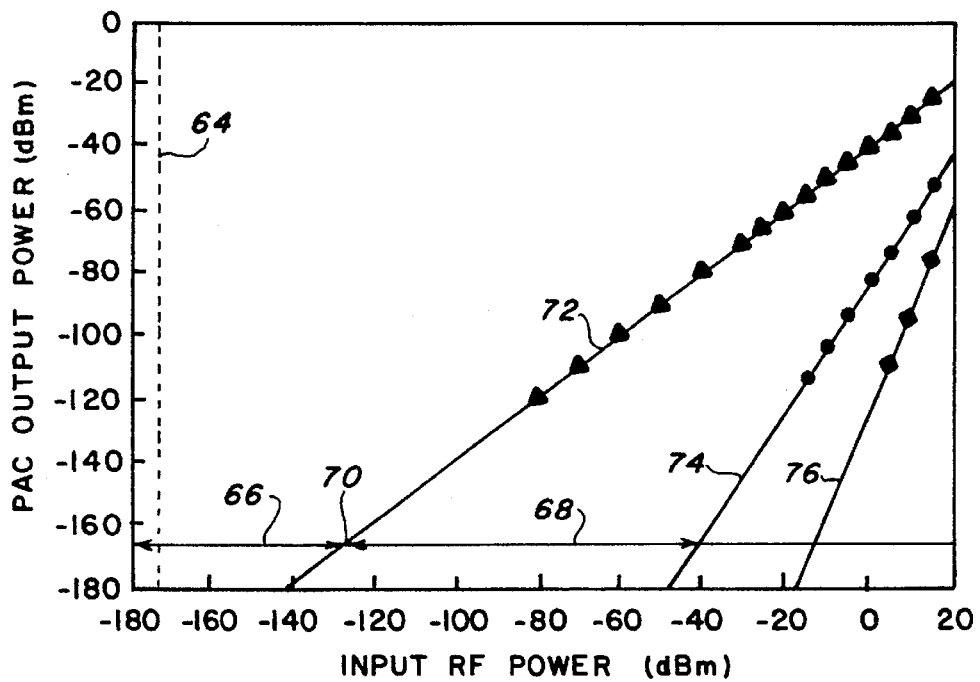
FIG. 7 illustrates performance parameters associated with the prior art optical link of FIG. 1.
Figure 8:
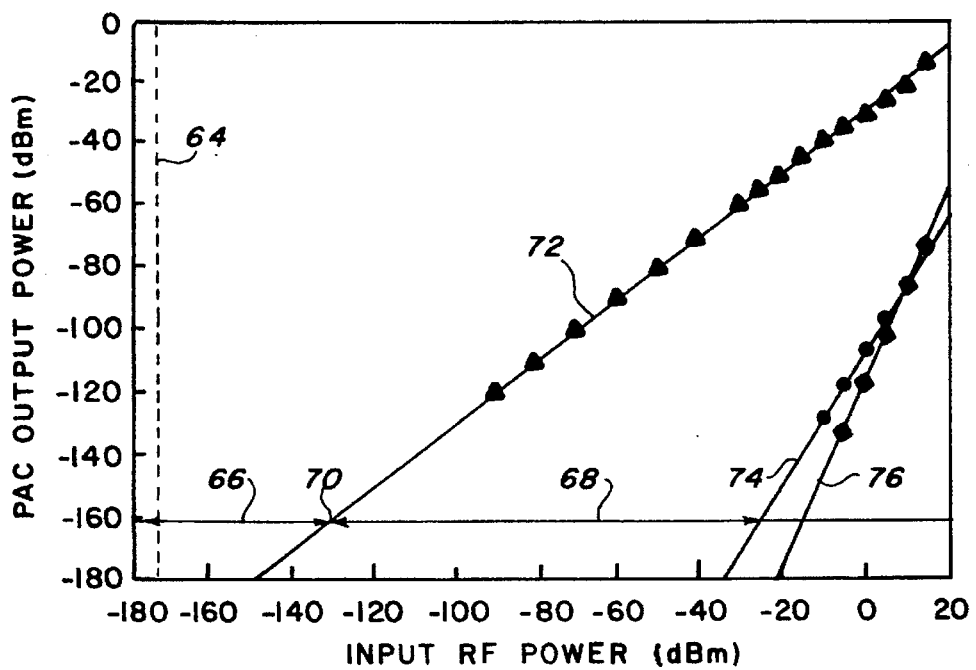
FIG. 8 illustrates the improved performance parameters associated with the optical link of the present invention.

Further testing was performed in the practice of this invention using the prior art optical link 10 of FIG. 1 having the results shown in FIG. 7, and the optical link 28 of FIG. 3 having results shown in FIG. 8. Both FIGS. 7 and 8 have an X axis indicating the applied rf signal given in dBm, and a Y axis indicating the output signal $P_{AC}$ of the respective links, and also given in dBm. Both FIGS. 7 and 8 illustrate plots, indicated given by a reference number, for the performance parameters given in Table 1.

TABLE 1

| REFERENCE NO. | PARAMETER |
| --- | --- |
| 64 | Input Thermal Noise |
| 66 | Noise Factor (NF) |
| 68 | Spurious Free Dynamic Range (SFDR) |
| 70 | Measured Output Noise |
| 72 | Plot of the Fundamental (110 MHz) Signal |
| 74 | Plot of the Second order (220 MHz) Signal |
| 76 | Plot of Third order (330 MHz) Signal |

The associated current in which the related detector circuits 16 (FIG. 1) and 40 and 44 (FIG. 3) operated was approximately 1.1 milliamps thereby advantageously keeping each in its linear range of operation. The associated laser was a Nd:YAG source with an operating wavelength of 1.3 micrometers and supplied an optical carrier $I_0$ having a power of 300 milliwatts. The optical carrier $I_0$ was modulated by an information signal of 110 MHz.

A comparison between FIGS. 7 and 8 reveals that a 28 dB reduction in the second harmonic at −25 dbm rf input (plots 74) was achieved using the optical link 28 of FIG. 3. Furthermore, a multi-octave spurious free dynamic range (sometimes referred to as linear dynamic range) (plots 68) was improved by 22 dB, and the noise factor (plots 66) was improved by 3 dB. Furthermore, the sensitivity of the single optical link 10 of FIG. 1 was measured and determined to be 0.15 microvolts, whereas the sensitivity of the optical link 28 of FIG. 3 was measured and determined to be 0.09 microvolts. This increased sensitivity makes the optical link 28 particularly suited for many electrical (E) field sensing application.

It should now be appreciated that the practice of the present invention provides for an optical link having an improved linear dynamic range, an improved sensitivity and a reduced noise factor, while at the same time having reduced unwanted even-order harmonic components.

Although the present invention has been primarily described as being used in telecommunication systems, the improved sensitivity of the optical link 28 also makes it particularly well suited to serve as an electric field sensor.

Furthermore, although the hereinbefore given description utilized a single laser source 12, the practice of the present invention contemplates that each of the modulators 32 and 34 of FIG. 3 may be arranged to accept separate laser signals generated by separate laser sources. This arrangement may be provided because the optical phase related to the laser source does not affect the quality of the combined output signal resulting in the final output signal $P_{AC}$ of the optical link of the present invention.

It should, therefore, be readily understood that many modifications and variations of the present invention are possible within the purview of the claimed invention. It is, therefore, to be understood that, within the scope of the appended claims, the invention may be practiced otherwise than as specifically described.

What is claimed is:

1. An optical link for modulating an optical carrier with an information signal comprising:

(a) an optical power spitter for receiving an optical carrier and providing about one-half of the power of said optical carrier to a first path having a predetermined path and the remaining power of said optical carrier being provided to a second path having a predetermined path;

(b) a first modulator means receiving said optical carrier at said first path and having means for receiving both said information signal and a phase bias signal with a positive offset quantity to preset the operating point of said first modulator means, said first modulator means providing a first optical output signal modulated by said information signal and representative of said optical carrier present at said first path;

(c) a second modulator means receiving said optical carrier at said second path and having means for receiving said information signal and a phase bias signal with a negative offset quantity to preset the operating point of said second modulator means, said second modulator means providing a second optical output signal modulated by said information signal and representative of said optical carrier present at said second path;

(d) a first detector receiving said first optical output signal and providing a representative first AC output signal thereof;

(e) a second detector receiving said second optical output signal and providing a representative second AC output signal thereof; and (f) a 180° phase shift device connected to receive one of said first A.C. output signal and one of said second A.C. output signal and having means for connecting its output to the other of said first A.C. output signal and the other of said second A.C. output signal so as to be combined therewith and providing an output signal for said optical link.

2. The optical link according to claim 1, wherein said phase bias signals received by said first and second modulators are DC signals and each of said first and second detectors have means to provide a respective output signal that is substantially free of any DC components.

3. The optical link according to claim 1, wherein each of said first and second modulators is a Mach-Zehnder interferometer.

4. The optical link according to claim 1, wherein said optical power splitter is adjustable so that said first and second rf output signals each have substantially the same power.

5. The optical link according to claim 1, wherein the predetermined path traveled by said optical carrier entering said first path and appearing at the output of said 180° phase shifter is substantially the same as the predetermined electrical path traveled by said optical carrier entering said second path and appearing at the output of said 180° phase shifter.

6. The optical link according to claim 1, wherein said optical carrier is routed to said optical power splitter by an optical fiber and each of said first and second optical output signals is routed to its respective detector by a respective optical fiber.

7. The optical link according to claim 1, wherein said means for connecting the output of said 180° phase shifter to the other of said first and second output signals is a signal combiner.

8. The optical link according to claim 1, wherein:

said information signal is represented by below expression;

$$\phi_m \cdot \sin(\omega t); \qquad \text{Expression (1)}$$

said phase bias signal with a positive offset quantity is represented by below expression;

$$\pi + \alpha \qquad \text{Expression (2)}$$

where $\pi$ corresponds to the 180° phase angle of the first optical output signal and $\alpha$ has a value of about 45° or less;

said phase bias signal with a negative offset quantity is represented by the below expression;

$$\pi - \alpha \qquad \text{Expression (3)}$$

where $\pi$ corresponds to the 180° phase angle of the second optical output signal and $\alpha$ has a value of about 45° or less;

said first optical output signal is represented by the below expression;

$$I_1 = \frac{1}{2} I_{01} \left[ 1 - \cos\alpha + \phi_m \sin\alpha \sin\omega t - \left(\frac{\phi_m}{2}\right)^2 \cos\alpha \cos 2\omega t + \ldots \right] \qquad \text{Expression (4)}$$

where $I_{01}$ represents said optical carrier entering said first path;

said second optical output signal is represented by the below expression;

$$I_2 = \frac{1}{2} I_{02} \left[ 1 - \cos\alpha + \phi_m \sin\alpha \sin\omega t - \left(\frac{\phi_m}{2}\right)^2 \cos\alpha \cos 2\omega t + \ldots \right]$$

Expression (5)

where $I_{02}$ represents said optical carrier entering said second path; and said output signal of said optical link is represented by the below expression;

$$P_{AC} = \frac{1}{4} R \cdot I_0 [2\phi_m \sin\alpha \sin\omega t + \text{higher order odd harmonic components}]$$

Expression (6).

* * * * *